(12) United States Patent
Benkert et al.

(10) Patent No.: US 12,071,042 B2
(45) Date of Patent: Aug. 27, 2024

(54) METHOD FOR DETERMINING THE TEMPERATURE OF AN ACTIVE LAYER OF A HEATING RESISTOR

(71) Applicant: Vitesco Technologies GmbH, Hannover (DE)

(72) Inventors: Maximilian Benkert, Munich (DE); Egor Sawazki, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 1201 days.

(21) Appl. No.: 16/645,958

(22) PCT Filed: Sep. 26, 2018

(86) PCT No.: PCT/EP2018/076068
§ 371 (c)(1),
(2) Date: Mar. 10, 2020

(87) PCT Pub. No.: WO2019/063591
PCT Pub. Date: Apr. 4, 2019

(65) Prior Publication Data
US 2020/0276901 A1 Sep. 3, 2020

(30) Foreign Application Priority Data
Sep. 27, 2017 (DE) ..................... 10 2017 217 194.4

(51) Int. Cl.
*G01K 7/16* (2006.01)
*B60L 7/08* (2006.01)
(Continued)

(52) U.S. Cl.
CPC .................. *B60L 7/08* (2013.01); *B60L 7/22* (2013.01); *B60T 17/22* (2013.01); *G01K 7/183* (2013.01); *G01K 7/16* (2013.01)

(58) Field of Classification Search
CPC .......... B60T 17/22; G01K 7/183; G01K 7/16; G01K 7/18
See application file for complete search history.

(56) References Cited

U.S. PATENT DOCUMENTS 4,422,021 A * 12/1983 Schwarz ................... H02P 3/14
                                                            318/261
4,523,084 A    6/1985 Tamura et al. ............... 219/497
(Continued)

FOREIGN PATENT DOCUMENTS

AT          525680 B1 *  4/2024  ............. B60K 11/02
AU      2015391669 A1 * 11/2017  ................ F02C 1/05
(Continued)

OTHER PUBLICATIONS

16645958_2023-09-13_WO_2005015190_A1_H.pdf, May 2002.*
(Continued)

*Primary Examiner* — Gail Kaplan Verbitsky
(74) *Attorney, Agent, or Firm* — Slayden Grubert Beard PLLC

(57) ABSTRACT

Various embodiments include method for determining a temperature of an active layer of a heating resistor for a recuperation system of a motor vehicle comprising: determining an instantaneous value of a current flowing through the active layer of the heating resistor at a first time; determining an instantaneous value of a voltage present on the active layer at the first time; calculating an instantaneous value of an electrical resistance based on the determined instantaneous value of the current and the determined instantaneous value of the voltage; and determining an instantaneous value of a temperature of the active layer from the calculated value of the electrical resistance.

8 Claims, 3 Drawing Sheets

(51) Int. Cl.
  *B60L 7/22* (2006.01)
  *B60T 17/22* (2006.01)
  *G01K 7/18* (2006.01)

(56) References Cited

U.S. PATENT DOCUMENTS

| | | | |
|---|---|---|---|
| 4,762,427 A * | 8/1988 | Hori | G01N 27/18 |
| | | | 374/185 |
| 6,538,415 B1 * | 3/2003 | Fang | G01K 7/22 |
| | | | 320/150 |
| 9,096,134 B2 | 8/2015 | Namou et al. | |
| 2004/0100231 A1 | 5/2004 | Koerner et al. | 323/265 |
| 2013/0156072 A1 * | 6/2013 | Hebiguchi | G01R 31/382 |
| | | | 374/183 |
| 2016/0156179 A1 * | 6/2016 | Walter | H02H 3/202 |
| | | | 361/91.1 |
| 2018/0297450 A1 | 10/2018 | Schriek et al. | |

FOREIGN PATENT DOCUMENTS

| | | | | |
|---|---|---|---|---|
| CN | 103213512 A | | 7/2013 | B60L 11/18 |
| CN | 206468716 U | * | 9/2017 | |
| DE | 32 32 661 A1 | | 3/1983 | G05D 23/24 |
| DE | 10 2004 046 275 A1 | | 7/2005 | G01K 7/16 |
| DE | 102008001900 A1 | * | 11/2009 | B60K 6/48 |
| DE | 10 2012 023 366 A1 | | 6/2014 | G05D 23/19 |
| EP | 0775912 A1 | * | 5/1997 | |
| EP | 0775912 A1 | * | 5/1997 | |
| EP | 1 610 454 A1 | | 12/2005 | B60L 3/12 |
| EP | 1610454 A1 | | 12/2005 | G01K 7/00 |
| FR | 2932014 A1 | * | 12/2009 | B60L 11/1881 |
| FR | 3033669 A1 | * | 9/2016 | H01M 12/08 |
| JP | S62277081 A | * | 12/1987 | |
| JP | S6353796 B2 | * | 10/1988 | |
| JP | H01209902 A | * | 8/1989 | |
| JP | S6344926 B2 | * | 9/1998 | |
| JP | 4062967 B2 | * | 3/2008 | |
| JP | 2008096140 A | * | 4/2008 | |
| KR | 20090050970 A | * | 5/2009 | |
| WO | WO2005015190 A1 | * | 5/2002 | |
| WO | WO-2005015190 A1 | * | 2/2005 | G01N 27/123 |
| WO | WO-2017025534 A1 | * | 2/2017 | B60H 1/00314 |
| WO | 2017/063904 A1 | | 4/2017 | B60L 7/10 |
| WO | 2019/063591 A1 | | 4/2019 | B60L 7/02 |

OTHER PUBLICATIONS

16645958_2023-09-13_FR_2932014_A1_H.pdf,Nov. 1996.*
16645958_2023-09-13_EP_0775912_A1_H.pdf,May 1997.*
16645958_2023-09-13_AU_2015391669_A1_H.pdf, Nov. 2017.*
16645958_2023-09-13_WO_2017025534_A1_H.pdf, Feb. 2017.*
16645958_2023-09-13_DE_102008001900_A1_H.pdf,Nov. 2009.*
16645958_2023-09-13_EP_1610454_A1_H.pdf,Dec. 2005.*
16645958_2023-09-13_JP_S6344926_B2_I.pdf,Sep. 1998.*
16645958_2023-09-13_JP_2008096140_A_H.pdf,Apr. 2008.*
16645958_2023-09-13_AU_2015391669_A1_H.pdf,Nov. 2, 2017.*
16645958_2023-09-13_DE_102008001900_A1_H.pdf,Nov. 26, 2009.*
16645958_2023-09-13_EP_0775912_A1_H.pdf,May 28, 1997.*
16645958_2023-09-13_EP_1610454_A1_H.pdf,Dec. 28, 2005.*
16645958_2023-09-13_FR_2932014_A1_H.pdf,Dec. 4, 2009.*
16645958_2023-09-13_JP_2008096140_A_H.pdf,Apr. 24, 2008.*
16645958_2023-09-13_WO_2005015190_A1_H.pdf,Feb. 17, 2005.*
16645958_2023-09-13_WO_2017025534_A1_H.pdf,Feb. 16, 2017.*
16645958_2024-02-26_CN_206468716_U_H.pdf,Sep. 5, 2017.*
16645958_2024-02-26_FR_3033669_A1_H.pdf,Sep. 16, 2016.*
16645958_2024-02-26_KR_20090050970_A_H.pdf,May 20, 2009.*
16645958_2024-02-29_JP_4062967_B2_H.pdf,Mar. 19, 2008.*
16645958_2024-02-29_JP_S6353796_B2_H.pdf,Oct. 25, 1988.*
16645958_2024-02-29_JP_S62277081_A_H.pdf,Dec. 1, 1987.*
16645958_2024-02-29_JP_H01209902_A_H.pdf,Aug. 23, 1989.*
16645958_2024-05-15_AT_525680_B1_H.pdf,Apr. 15, 2024.*
German Office Action, Application No. 10 2017 217 194.4, 7 pages, Sep. 11, 2018.
International Search Report and Written Opinion, Application No. PCT/EP2018/076068, 14 pages, Jan. 4, 2019.
Chinese Office Action, Application No. 201880063255.9, 13 pages, Oct. 8, 2022.

* cited by examiner

METHOD FOR DETERMINING THE TEMPERATURE OF AN ACTIVE LAYER OF A HEATING RESISTOR

CROSS-REFERENCE TO RELATED APPLICATIONS

This application is a U.S. National Stage Application of International Application No. PCT/EP2018/076068 filed Sep. 26, 2018, which designates the United States of America, and claims priority to DE Application No. 10 2017 217 194.4 filed Sep. 27, 2017, the contents of which are hereby incorporated by reference in their entirety.

TECHNICAL FIELD

The present disclosure relates to heating resistors. Various embodiments may include methods for determining a temperature of an active layer of a heating resistor for a recuperation system of a motor vehicle and to a method for operating a recuperation system, heating resistors for a recuperation system of a motor vehicle, and/or a recuperation system having the heating resistor and to a vehicle having the recuperation system.

BACKGROUND

Electric vehicles may have a heating resistor to continue to allow a recuperation mode even with a traction battery that is no longer able to absorb energy (for example due to temperature conditions or excessively high state of charge). This allows less mechanical brake wear and higher overall energy efficiency of the vehicle. Generated electrical energy is in particular able to be converted, via the heating resistor, into heat that is able to be dissipated via a cooling circuit. However, in order to ensure stable operation, the temperature of the active layer of the heating resistor must not exceed certain limit values. In order to be able to guarantee this, the active layer of the heating resistor typically has an integrated temperature sensor. In addition, a certain minimum temperature gap must be maintained in order to avoid excess temperatures owing to the always sluggish measurement of thermal variables. Such excess temperatures may lead to irreversible damage or to a drastic reduction in the service life of the heating resistor.

If no temperature sensor is installed in the active heating layer or in the active heating wire (for example for cost reasons or packaging reasons), then the gap between the estimated temperature and the permitted maximum temperature must be selected to be even greater in order to avoid possible excess temperatures. This leads to the heating wire being used in a less than optimum manner, since a possible capacity is not able to be exploited for safety reasons. Furthermore, owing to the highly dynamic current load on the heating resistor, it is possible to predict or forecast the absorption capacity of electrical energy only with difficulty.

SUMMARY

As an example, some embodiments of the present disclosure include a method for determining a temperature ($T_1$) of an active layer (2) of a heating resistor (1) for a recuperation system of a motor vehicle, the method comprising the steps of: determining an instantaneous value of a current ($I_1$) flowing through an active layer (2) of a heating resistor (1) at a first time ($t_1$), determining an instantaneous value of a voltage ($U_1$) that is present on the active layer (2) of the heating resistor (1) at the first time ($t_1$), calculating an instantaneous value of an electrical resistance ($R_1$) from the determined instantaneous value of the current ($I_1$) and from the determined instantaneous value of the voltage ($U_1$) and determining an instantaneous value of a temperature ($T_1$) of the active layer (2) from the calculated value of the electrical resistance ($R_1$).

Some embodiments include determining a future thermal absorption capacity of the active layer (2) based on the determined instantaneous value of the temperature ($T_1$) of the active layer (2).

As another example, some embodiments include a method for operating a recuperation system of a motor vehicle having a heating resistor (1), having the steps of: determining a temperature ($T_1$) of an active layer (2) of the heating resistor (1) for the recuperation system, determining a future thermal absorption capacity of the active layer (2) based on the determined instantaneous value of the temperature ($T_1$) of the active layer (2), predicting an anticipated braking duration, determining an amount of thermal energy to be absorbed by the heating resistor (1) based on the predicted anticipated braking duration, and activating a friction brake of the recuperation system if the determined thermal energy to be absorbed by the heating resistor (1) exceeds the determined thermal absorption capacity of the active layer (2).

Some embodiments include determining a ratio of a friction braking force to be set to the recuperation braking force depending on a ratio of the determined thermal absorption capacity of the active layer (2) of the heating resistor (1), on the one hand, and an expected generated braking energy, on the other hand.

In some embodiments, determining the instantaneous value of the temperature ($T_1$) of the active layer (2) comprises the following steps: storing pairs of values that each comprise a value of an electrical resistance ($R_i$) and a value of a temperature ($T_i$) in a database, determining that value of the electrical resistance ($R_x$) stored in the database that comes closest to the calculated instantaneous value of the electrical resistance ($R_1$) of the active layer (2), and selecting the associated value of the temperature ($T_x$), stored in the database in the same pair of values, as the instantaneous value of the temperature ($T_1$) of the active layer.

In some embodiments, the instantaneous value of the current ($I_1$) and the instantaneous value of the voltage ($U_1$) are determined by way of power electronics (3) of the heating resistor (1).

In some embodiments, the instantaneous value of the voltage ($U_1$) is determined on a battery of the recuperation system.

In some embodiments, a voltage pulse is emitted to the heating resistor (1) after the expiry of a defined period of time within which the heating resistor (1) has not been used.

In some embodiments, the determined instantaneous value of the temperature ($T_1$) of the active layer (2) of the heating resistor (1) is transmitted to a drivetrain of the vehicle via a vehicle communication network (CAN).

Some embodiments include storing a temperature model in a database, wherein the temperature model comprises thermal inertias (12, 14, 16) and heat transfers (13, 15) of the heating resistor (1), and calculating a future electrical or thermal absorption capacity of the heating resistor (1) based on the temperature model stored in the database and the determined instantaneous value of the temperature ($T_1$) of the active layer (2).

As another example, some embodiments include a heating resistor (1) for a recuperation system of a motor vehicle, the heating resistor (1) comprising: an active layer (2), a heat sink (6), and power electronics (3), wherein the active layer (2) is configured so as to absorb electrical energy that is no longer able to be absorbed by a battery of the recuperation system, the heat sink (6) is arranged and designed such that a coolant is able to be channeled through the heat sink (6) and that heat is able to be transferred from the active layer to the heat sink (6) and the coolant, and the power electronics (3) are configured so as to perform a method as described above.

As another example, some embodiments include a recuperation system comprising a heating resistor (1) as described above.

As another example, some embodiments include a vehicle comprising a recuperation system as described above.

BRIEF DESCRIPTION OF THE DRAWINGS

Exemplary embodiments of the teachings of the present disclosure are discussed in more detail below on the basis of the schematic drawing. In the figures.

DETAILED DESCRIPTION

Figure 1:
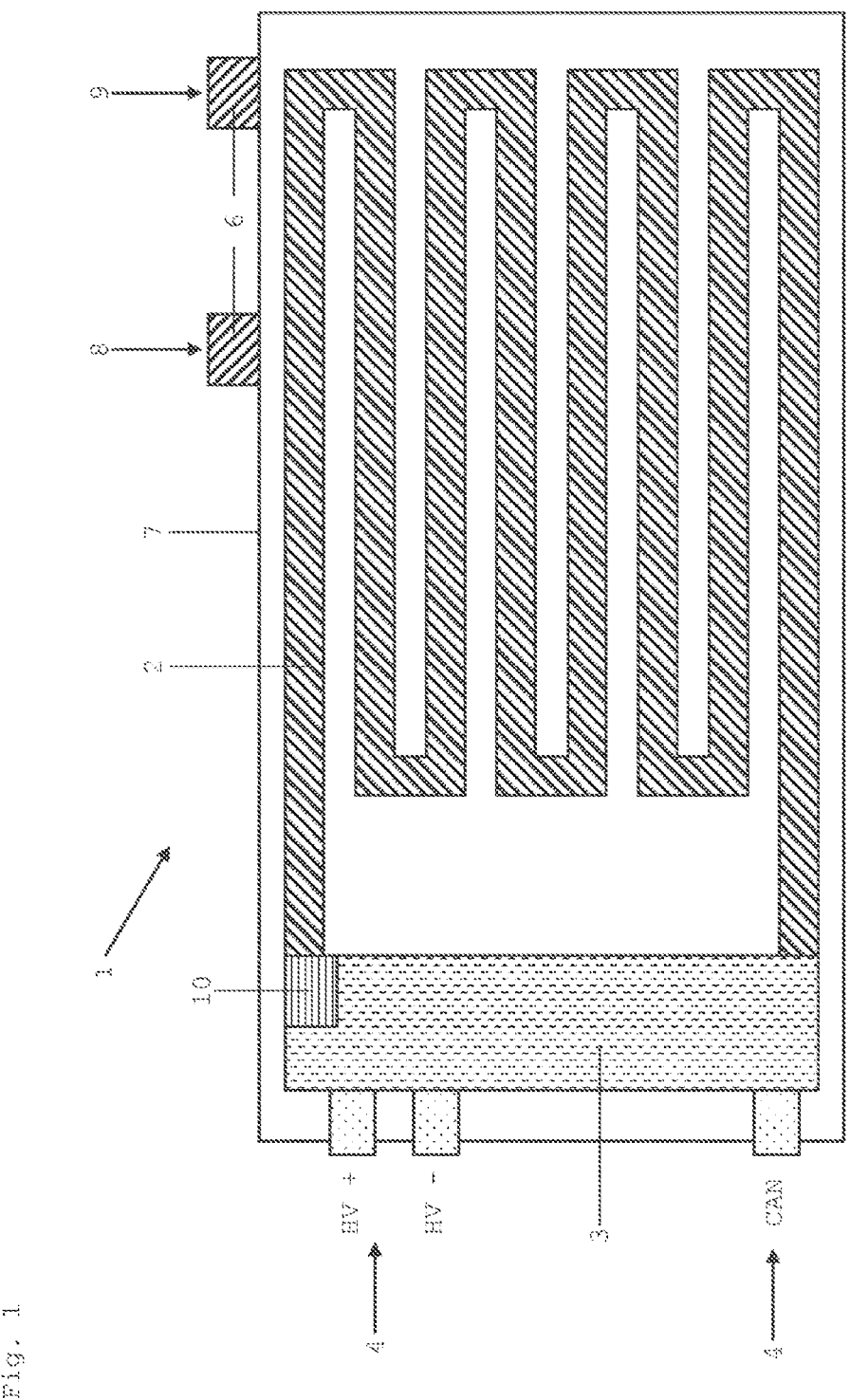
FIG. 1 shows a longitudinal sectional illustration of one exemplary embodiment of a heating resistor incorporating teachings of the present disclosure for a recuperation system of a motor vehicle.

The teachings of the present disclosure describe an alternative method for determining a temperature of an active layer of a heating resistor for a recuperation system of a motor vehicle, wherein the method increases the measurement speed and the measurement accuracy and allows an accurate forecast regarding the electric power still able to be absorbed, such that the heating wire is able to be operated closer to its maximum power without damage processes occurring due to an excess temperature.

In some embodiments, a method includes measures the voltage $U_1$ that is present on an active layer of a heating resistor and the current $I_1$ flowing through the active layer at a first time $t_1$. Based on the measured voltage $U_1$ and the measured current $I_1$, the electrical resistance $R_1$ at the first time is determined in accordance with Ohm's law ($R_1=U_1/I_1$). Since the ohmic resistance is temperature-dependent, it is possible in particular to use values stored in the power electronics to compare the average temperature $T_1$ prevailing in the active layer at the first time $t_1$. It is therefore proposed to determine a first temperature $T_1$ of the active layer at the first time $t_1$ from the determined electrical resistance $R_1$. Said method steps may be repeated continuously such that the temperature T of the active layer is able to be determined continuously.

In some embodiments, it possible to dispense with the temperature sensor, which has the disadvantages of thermal inertia. By virtue of the combined current and voltage measurement, which may be provided in particular via the power electronics, it is possible to increase the measurement speed and the measurement accuracy. Furthermore, it is possible to make an accurate forecast regarding the electric power still able to be absorbed. As a result, the heating resistor is able to be operated closer to its maximum power without the risk of damage processes due to excess temperatures.

In some embodiments, a method for determining a temperature of an active layer of a heating resistor for a recuperation system of a motor vehicle includes an instantaneous value of a current flowing through an active layer of a heating resistor is determined. This determination, in particular measurement, takes place at a first time. Furthermore, an instantaneous value of a voltage that is present on the active layer of the heating resistor is determined. This determination, in particular measurement, also takes place at the first time. An instantaneous value of an electrical resistance is calculated from the determined instantaneous value of the current and from the determined instantaneous value of the voltage. An instantaneous value of a temperature of the active layer is determined from the calculated value of the electrical resistance. These method steps may in particular be performed by way of power electronics of the heating resistor. These method steps may furthermore be performed repeatedly in succession, such that the temperature of the active layer of the heating resistor is determined continuously or virtually continuously. The possibility of the high measurement speed due to the absence of thermally sluggish sensors and the provision of the current and voltage measurements allow the temperature of the active layer and thus also the power absorption capacity of the heating resistor to be determined in a highly dynamic manner.

In the context of a "braking operating strategy", it is expedient to determine the electrical resistance and the temperature as described above, and to derive therefrom what braking energy is still able to be absorbed by the heating resistor. If it is predicted or forecast in this case that braking will take place for longer than allowed by the thermal absorption capacity of the heating resistor, a friction brake may already be activated at the time at which this is predicted. In particular, a ratio of the friction braking force to be set to the recuperation braking force may be determined depending on the ratio of the thermal absorption capacity of the active layer of the heating resistor, on the one hand, and the expected generated braking energy, on the other hand.

In some embodiments, the method furthermore comprises determining a future thermal absorption capacity of the active layer based on the determined instantaneous value of the temperature of the active layer.

In some embodiments, a method for operating a recuperation system, includes: predicting an anticipated braking time, determining an amount of thermal energy to be absorbed by the heating resistor based on the predicted anticipated braking time, and activating a friction brake of the recuperation system if the determined thermal energy to be absorbed by the heating resistor exceeds the determined thermal absorption capacity of the active layer.

Determining the instantaneous value of the temperature of the active layer may furthermore comprise the following steps: storing pairs of values that each comprise a value of an electrical resistance and a value of a temperature in a database, determining that value of the electrical resistance stored in the database that comes closest to the calculated instantaneous value of the electrical resistance of the active layer, and selecting the associated value of the temperature, stored in the database in the same pair of values, as the instantaneous value of the temperature of the active layer.

In some embodiments, the pairs of values or the database may in particular be stored in the power electronics of the heating resistor, and the power electronics may be configured so as to perform the determination and selection steps additionally provided. Implementing the determination of the instantaneous value of the temperature of the active layer using pairs of values is particularly simple and robust. In some embodiments, a function of the temperature of the active layer may be stored in the database as a function of the electrical resistance of the active layer.

In some embodiments, the instantaneous value of the current and the instantaneous value of the voltage are determined by way of the power electronics of the heating resistor. In order to be able to operate the heating resistor, power electronics are required in any case, these supplying the active layer of the heating resistor with regulated current and voltage. These power electronics in this case have to perform a measurement of the transferred current and the applied voltage in order to function correctly. Since the current and voltage are measured in any case, the temperature of the active layer of the heating resistor or its active layer may also be determined in this way. These embodiments thus makes a contribution to being able to dispense with an additional component that performs the voltage measurement and the current measurement, since the power electronics that are typically required in any case for the functionality of the heating resistor are used.

In some embodiments, the instantaneous value of the voltage may be determined on a battery of the recuperation system. The voltage measurement may thus also be determined outside the heating resistor at the same voltage level. This results in the possibility for the heating resistor of being able to measure the temperature in the active part of the heating layer or the heating wire very quickly, and therefore also to be able to track high gradients well. If the heating resistor is not used for a relatively long period, the resistance and thus the temperature may be determined using small voltage pulses. In some embodiments, a voltage pulse is emitted to the heating resistor after the expiry of a defined period of time within which the heating resistor has not been used.

In some embodiments, the current temperature value may be processed by the power electronics. It is thereby possible to output a very exact value regarding the electric power currently able to be absorbed to the drivetrain via a vehicle communication network (for example CAN). In some embodiments, the determined instantaneous value of the temperature of the active layer of the heating resistor is transmitted to a drivetrain of the vehicle via a vehicle communication network.

In combination with a temperature model that is calculated or provided by the power electronics, statements may be made about the future electrical or thermal absorption capacity of the heating resistor. For this purpose, the model must contain the thermal inertias and the heat transfers. The temperature of the active layer of the heating resistor, as determined by way of the current measurement and voltage measurement described above, may likewise be incorporated into this forecast model.

In some embodiments, the method comprises the following steps: storing a temperature model in a database, wherein the temperature model comprises thermal inertias and heat transfers of the heating resistor, and calculating a future electrical or thermal absorption capacity of the heating resistor based on the temperature model stored in the database and the determined instantaneous value of the temperature of the active layer.

Some embodiments include a heating resistor for a recuperation system of a motor vehicle. The heating resistor comprises an active layer, a heat sink and power electronics, wherein the active layer is configured so as to absorb electrical energy that is no longer able to be absorbed by a battery of the recuperation system, for example since the battery is already fully charged or temperature conditions are too high. The heat sink is furthermore arranged and designed such that a coolant is able to be channeled through the heat sink and that heat is able to be transferred from the active layer to the heat sink and the coolant. The power electronics are furthermore configured so as to perform a method as described above.

Some embodiments include a recuperation system that comprises a heating resistor as described above. Some embodiments include a vehicle that comprises a recuperation system as described above. The vehicle is for example a motor vehicle, such as an automobile, a bus or a truck, or else a rail vehicle, a ship, an aircraft, such as a helicopter or an airplane, or for example a bicycle.

FIG. 1 shows a heating resistor 1 for a recuperation system of a motor vehicle. The heating resistor 1 comprises an active layer 2, power electronics 3, a high-voltage connection 4 with a positive pole and a negative pole, a connection 5 to a vehicle communication network in the form of a CAN, and a heat sink in the form of a cooling channel 6, which runs through a housing 7 of the heating resistor 1 in order to cool the active layer 2 and has an outflow connection 8 for a coolant and a return connection 9 for the coolant.

The active layer 2 is configured so as to absorb electrical energy that is no longer able to be absorbed by a battery of the recuperation system, for example since the battery is already fully charged or the temperature conditions are too high. The coolant may be channeled through the cooling channel 6, wherein heat may be transferred from the active layer 2 to the cooling channel body 6 and the coolant located therein.

In some embodiments, the power electronics 3 may perform a combined current and voltage measurement. In this case, a voltage $U_1$ that is present on the active layer 2 may be measured at a first time $t_1$. A current $I_1$ flowing through the active layer 2 may furthermore likewise be measured at the first time $t_1$. In some embodiments, the instantaneous value of the voltage $U_1$ may be determined on a battery (not shown) of the recuperation system.

Figure 2:
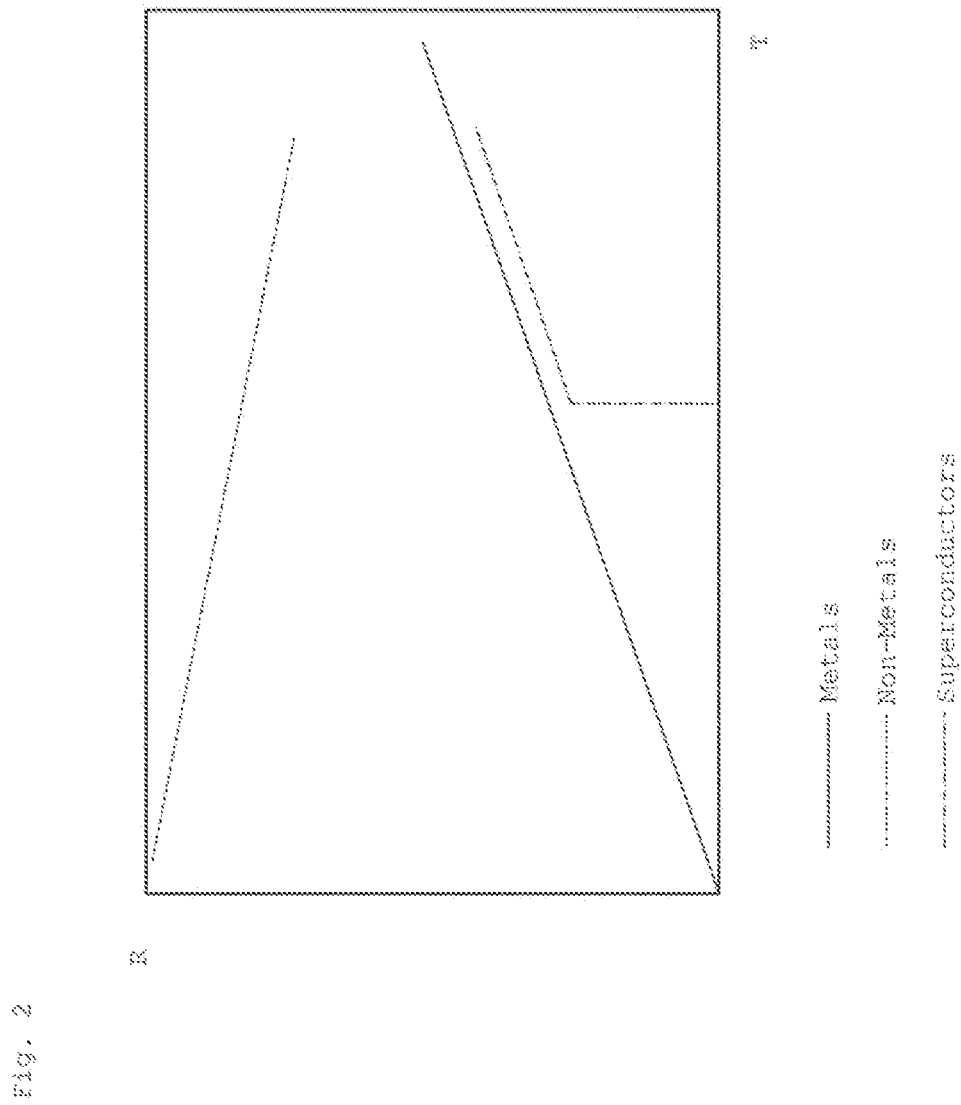
FIG. 2 shows a resistance-temperature graph for metals, non-metals and superconductors.

Based on the measured voltage $U_1$ and the measured current $I_1$, the electrical resistance $R_1$ at the first time is able to be determined in accordance with Ohm's law ($R_1=U_1/I_1$). Since the ohmic resistance is temperature-dependent (see FIG. 2), it is possible to use values stored in the power electronics, in particular pairs of values or a formula, to compare the average temperature $T_1$ prevailing in the active layer at the first time $t_1$. The determined instantaneous value of the temperature $T_1$ of the active layer 2 of the heating resistor 1 may be transmitted to a drivetrain (not shown) of the vehicle via the CAN.

In some embodiments, the power electronics 3 may have a storage unit on which a plurality of pairs of values are stored in a database. The individual pairs of values each comprise a resistance value $R_i$ and a temperature value $T_i$. The power electronics 3 may compare the determined resistance value $R_1$ with the resistance values of the pairs of values. By way of example, a resistance value $R_x$ in a pair of values x may come closest to the determined resistance value $R_1$. If the power electronics 3 determine this, then they may select the associated temperature value $T_x$ in the pair of values x as the instantaneous value of the temperature $T_1$ of the active layer 2. In some embodiments, a function of the temperature T may also be stored in the database as a function of the electrical resistance R (cf. FIG. 2), wherein the power electronics 3 may be configured so as to determine a corresponding instantaneous temperature value $T_1$ of the active layer 2 of the heating resistor 1 at a time $t_1$ from a determined instantaneous resistance value $R_1$.

In the sense of a predictive braking strategy, the power electronics 3 may be configured so as to derive what braking energy is still able to be absorbed by the heating resistor 1 from the determined temperature $T_1$. If it is predicted or forecast in this case that braking will take place for longer than allowed by the thermal absorption capacity of the heating resistor 1, then a friction brake (not shown) of the recuperation system may already be activated at the time at which this is predicted. In some embodiments, a ratio of the friction braking force to be set to the recuperation braking force may be determined depending on the ratio of the thermal absorption capacity of the active layer 2 of the heating resistor 1, on the one hand, and the expected generated braking energy, on the other hand. If the heating resistor 1 is not used for a relatively long period, the resistance R and thus the temperature T may be determined using small voltage pulses.

In combination with a temperature model that is calculated or provided by the power electronics 3, statements may be made about the future electrical or thermal absorption capacity of the heating resistor 1. For this purpose, the model must contain the thermal inertia and the heat transfers. The temperature $T_1$ of the active layer 2 of the heating resistor 1, as determined by way of the current measurement and voltage measurement described above, may likewise be incorporated into this forecast model.

Figure 3:
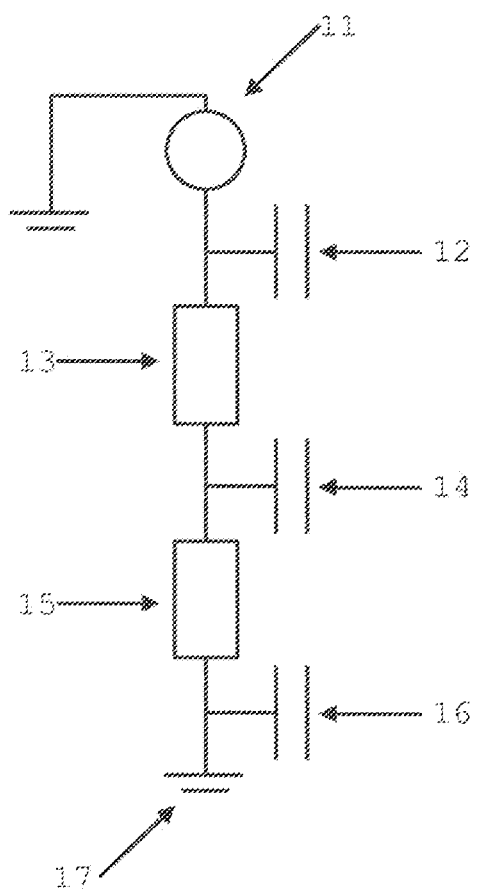
FIG. 3 shows a circuit diagram with heat transfers on one exemplary embodiment of a heating incorporating teachings of the present disclosure for a recuperation system of a motor vehicle.

In this regard, FIG. 3 shows an exemplary temperature model with a heat source 11, for example caused by current or voltage in the active layer 2 of the heating resistor 1. A heating wire or a heating surface having the active layer 2 in this case forms a first heat carrier 12. A first heat transfer 13 takes place from the first heat carrier 12 to the body of the cooling channel 6, which forms a second heat carrier 14. A second heat transfer 15 takes place from the second heat carrier 14 to the coolant, which is channeled through the cooling channel 6 and forms a third heat carrier 16. The cooling channel 6 or a cooling circuit formed thereby forms a heat sink 17. The three heat carriers 12, 14 and 16 form thermal inertias of the heating resistor 1.

The invention claimed is:

1. A method for operating a recuperation system of a motor vehicle having a heating resistor and a braking system, the method comprising:
    determining an instantaneous value of a current flowing through an active layer of the heating resistor at a first time;
    determining an instantaneous value of a voltage present on the active layer at the first time;
    calculating an instantaneous value of an electrical resistance of the active layer based on the determined instantaneous value of the current and the determined instantaneous value of the voltage;
    determining an instantaneous value of a temperature of the active layer from the calculated value of the electrical resistance;
    determining a capacity of the active layer to absorb thermal energy based on the determined instantaneous value of the temperature of the active layer;
    receiving an anticipated braking duration from the braking system;
    determining an amount of energy to be generated by the braking system; and
    if the amount of energy to be generated exceeds the determined capacity of the active layer, activating a friction brake of the recuperation system based on an amount of excess energy, else absorbing the energy generated in the heating resistor.

2. The method for operating a recuperation system as claimed in claim 1, further comprising determining a ratio of a friction braking force in relation to the amount of energy to be generated to be set to the recuperation braking force depending on a ratio of the determined thermal absorption capacity of the active layer of the heating resistor, on the one hand, and an expected generated braking energy, on the other hand.

3. The method as claimed in claim 1, wherein determining the instantaneous value of the temperature of the active layer comprises:
    storing pairs of values wherein each pair comprises a value of an electrical resistance and a value of a temperature in a memory;
    determining that value of the electrical resistance stored in the memory coming closest to the calculated instantaneous value of the electrical resistance of the active layer; and
    using the associated value of the temperature stored in the database in the same pair of values as the instantaneous value of the temperature of the active layer.

4. The method as claimed in claim 1, wherein the instantaneous value of the current and the instantaneous value of the voltage are determined by way of power electronics of the heating resistor.

5. The method as claimed in claim 1, wherein the instantaneous value of the voltage is determined on a battery of the recuperation system.

6. The method as claimed in claim 1, further comprising transmitting a pulse of electrical energy to the heating resistor after a defined period of time has elapsed within which the heating resistor has not been used, irrespective of an anticipated braking.

7. The method as claimed in claim 1, further comprising:
    storing a temperature model in a database;
    wherein the temperature model comprises thermal inertias and heat transfers of the heating resistor; and
    calculating a future electrical or thermal absorption capacity of the heating resistor based on the temperature model stored in the database and the determined instantaneous value of the temperature of the active layer.

8. A heating resistor for a recuperation system of a motor vehicle, the heating resistor comprising:
    an active layer;
    a heat sink;
    and power electronics;
    wherein the active layer absorbs electrical energy exceeding an amount able to be absorbed by a battery of the recuperation system;
    the heat sink channels a coolant to transfer heat from the active layer through the heat sink to the coolant; and
    the power electronics are programmed to:
        determine an instantaneous value of a current flowing through the active layer of the heating resistor at a first time;
        determine an instantaneous value of a voltage present on the active layer at the first time;
        calculate an instantaneous value of an electrical resistance based on the determined instantaneous value of the current and the determined instantaneous value of the voltage; and determine an instantaneous value of a temperature of the active layer from the calculated value of the electrical resistance.

\* \* \* \* \*